United States Patent [19]

Fratello et al.

[11] Patent Number: 5,655,677
[45] Date of Patent: Aug. 12, 1997

[54] SEALED CARRIER VESSEL FOR PNEUMATIC TRANSPORT SYSTEM

[75] Inventors: Daniel A. Fratello, Golden; Eric Brandenburg, Franktown, both of Colo.; Nasser Pirshafiey, Chino Hills; Douglas Walker, Long Beach, both of Calif.

[73] Assignee: Translogic Corporation, Denver, Colo.

[21] Appl. No.: 604,840

[22] Filed: Feb. 22, 1996

[51] Int. Cl.$^6$ .................................................. B65G 51/00
[52] U.S. Cl. ........................... 220/4.22; 406/184; 406/190
[58] Field of Search ........................... 220/4.22, 4.23, 220/4.24; 406/186, 184, 190

[56] References Cited

U.S. PATENT DOCUMENTS

| | | | |
|---|---|---|---|
| 726,022 | 4/1903 | Burton | 406/186 |
| 1,751,079 | 3/1930 | Drumm | 220/326 X |
| 3,507,417 | 4/1970 | McCarthy et al. | 220/681 |
| 3,593,948 | 7/1971 | McClellan | 243/34 |
| 3,825,210 | 7/1974 | Weaver | 243/34 |
| 4,006,868 | 2/1977 | Hochradel et al. | 406/186 |
| 4,546,874 | 10/1985 | Kirchan | 220/4.24 |
| 4,905,857 | 3/1990 | Her | 220/4.22 |
| 4,938,360 | 7/1990 | Wallace | 206/586 |
| 4,948,303 | 8/1990 | Good | 406/186 |

FOREIGN PATENT DOCUMENTS

| | | | |
|---|---|---|---|
| 955910 | 2/1972 | Canada | 406/186 |
| 1133314 | 7/1962 | Germany | 406/186 |
| 4111494 | 10/1992 | Germany | 406/190 |

*Primary Examiner*—Steven M. Pollard
*Attorney, Agent, or Firm*—Sheridan Ross P.C.

[57] ABSTRACT

A carrier vessel for a pneumatic tube transport system provides substantially leak-free containment of fluids transported therein. The vessel includes first and second shell members having opposing engagement surfaces extending substantially about a perimeter thereof. A sealing member disposed adjacent one of the engagement surfaces is compressed between the engagement surfaces when the vessel is closed to provide substantially fluid-tight seal between the first and second shell members. The vessel includes removable wear bands connected to the shell members, a hinge interconnector assembly for connecting the shell members together at one of their longitudinal sides and latch assemblies for releasably connecting them together at an opposite longitudinal side.

25 Claims, 13 Drawing Sheets

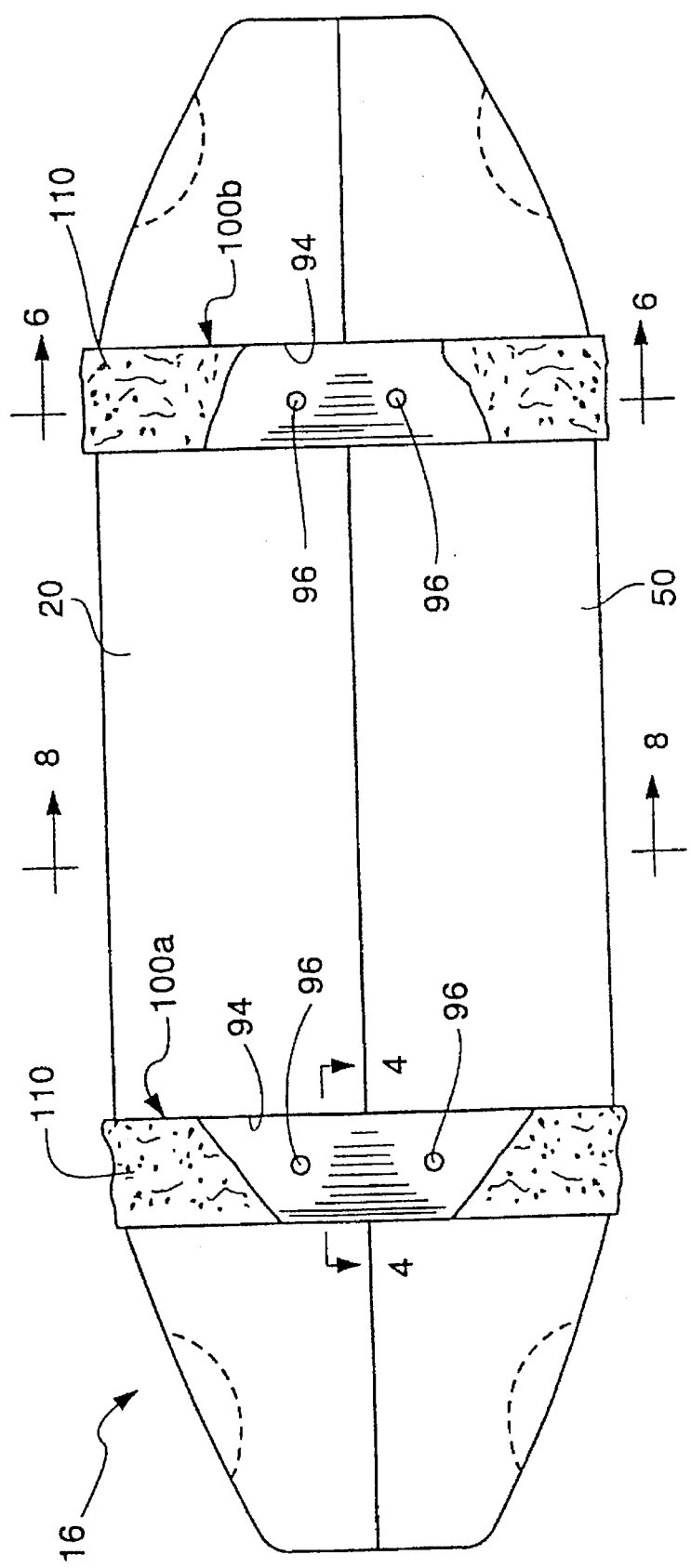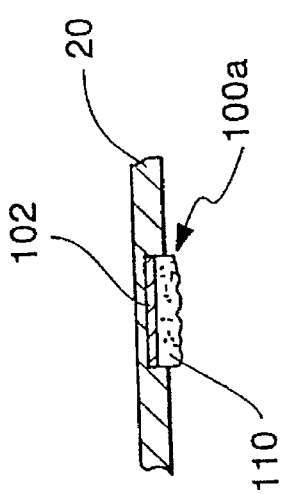

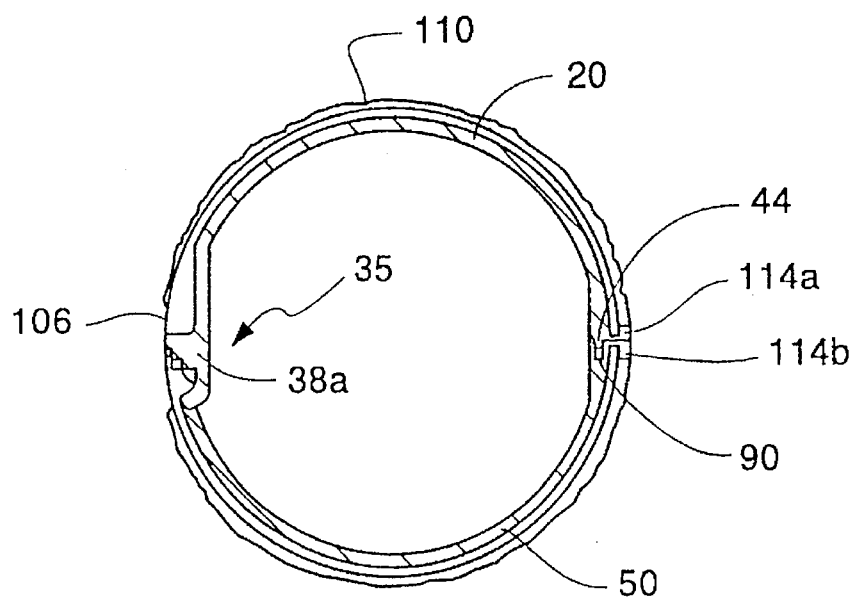
Fig. 8
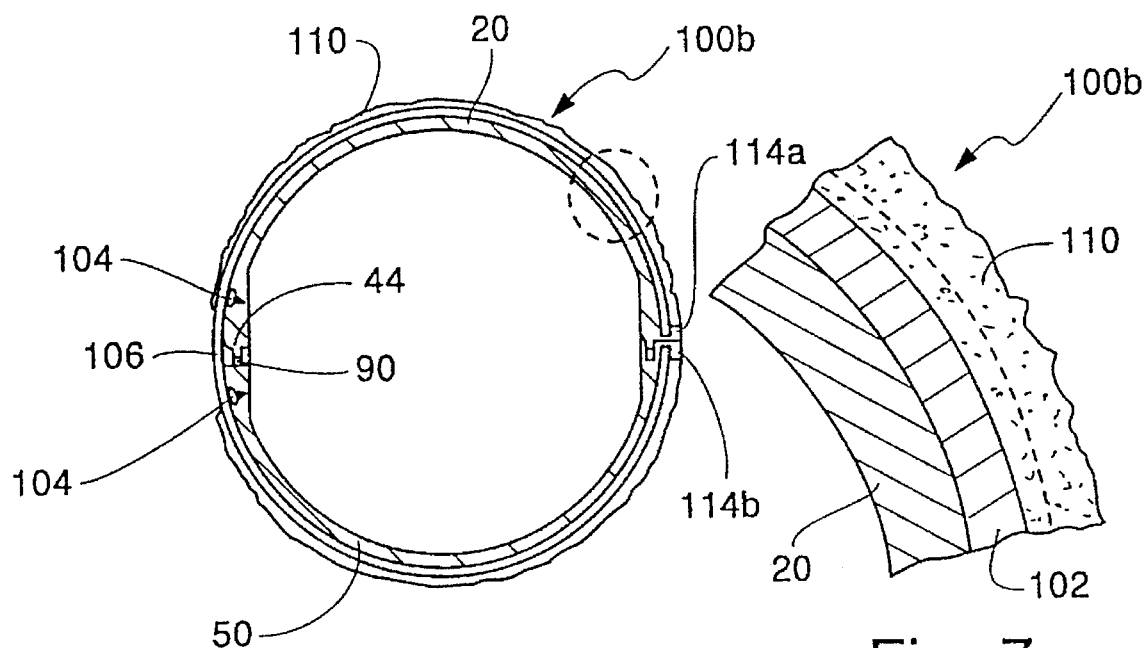
Fig. 6
Fig. 7

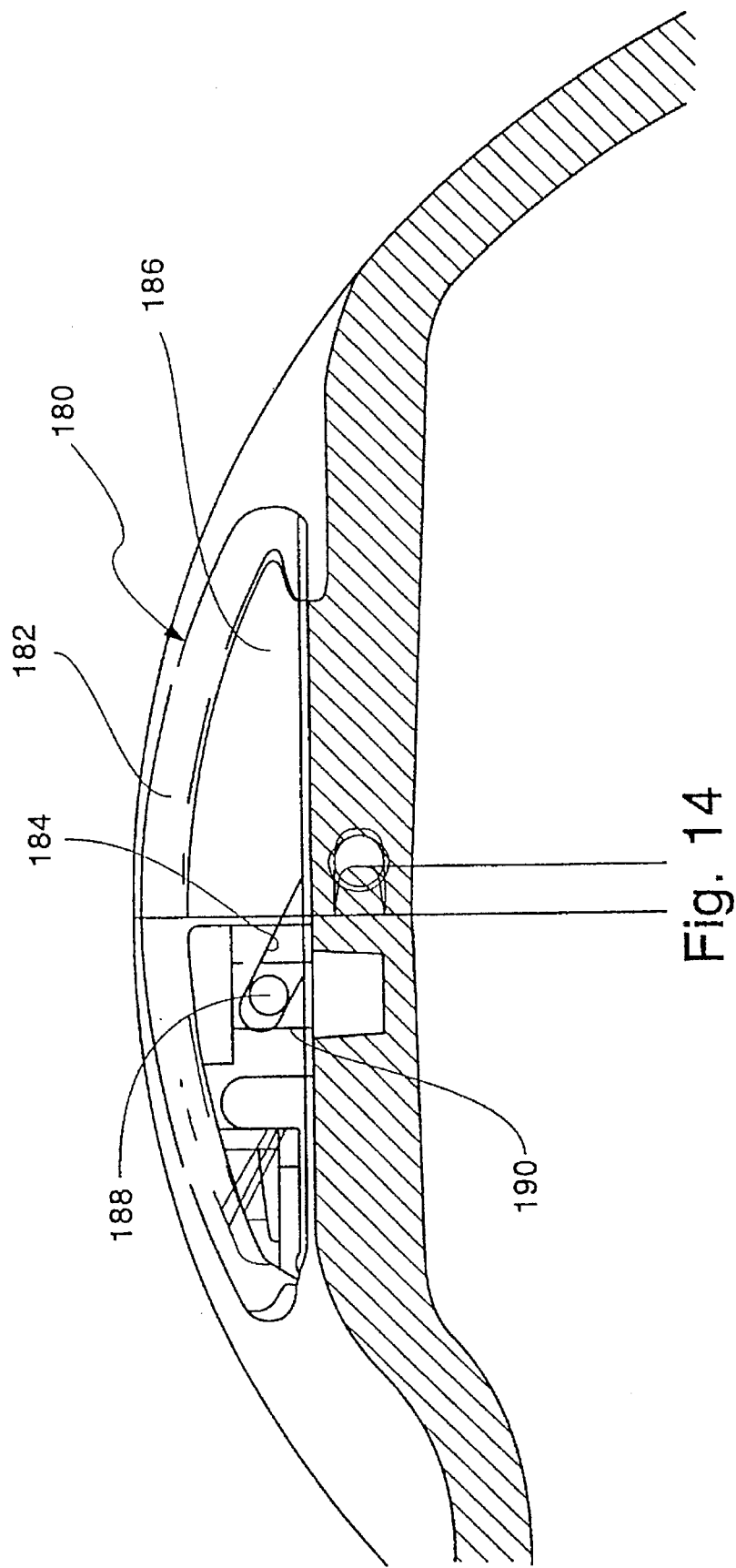

SEALED CARRIER VESSEL FOR PNEUMATIC TRANSPORT SYSTEM

FIELD OF THE INVENTION

The present invention relates to carrier vessels for use with pneumatic tube transport systems. More particularly, the present invention relates to a two-part carrier vessel having a sealed interface which provides a substantially leak-proof connection between contacting surfaces of the carrier vessel when the vessel is closed.

BACKGROUND OF THE INVENTION

Many buildings or structures include pneumatic tube transport systems for transporting objects, such as products, components, documents, drawings or other materials from one location in the building to another. Pneumatic tube transport systems typically comprise a number of substantially hermetically sealed tubes extending between locations in a building and a mechanism for selectively evacuating air from, or forcing air into, the tubes. In use, objects are placed in a carrier vessel, typically a substantially cylindrical housing, which is placed into the pneumatic tube transport system. The vessel is then propelled through the tube by creating a zone of relatively higher pressure on one side of the carrier vessel than on the other. This may be accomplished by creating a zone of negative pressure (e.g. a vacuum) in front of the vessel or by creating a zone of positive pressure behind the vessel.

In certain settings, the objects include containers housing fluids that need to be transported using the pneumatic tube transport system. For example, in the health care setting pneumatic tube transport systems are well adapted for transporting fluids such as laboratory samples, blood samples or other body fluids, or intravenous bags between areas of the building. However, when using pneumatic tube transport systems in the health care field, it is critical that the carrier vessels be suitable for transporting fluids. More particularly, it is necessary that the carrier vessels, upon closure, seal to provide substantially leak-proof containment of fluids, which may unwantedly spill from their primary containers into the vessel. Fluids which spill from their primary containers inside the vessel may leak from the vessel into the pneumatic tube posing a health risk and resulting in a risk that the pneumatic tubes may not properly function due to the presence of fluid in the system.

SUMMARY OF THE INVENTION

Accordingly, one object of the present invention is to provide a carrier vessel for use with a pneumatic tube transport system. Another object of the present invention is to provide a carrier vessel for use with a pneumatic tube transport system which is suitable for transporting fluids. Another object of the present invention is to provide a carrier vessel which, when closed, provides substantially leak-proof containment of fluids which may spill from a primary container into the vessel. In one embodiment, a further object of the present invention is to provide a carrier vessel having at least one wear band which exhibits sufficient resiliency along at least portions thereof to act as a hinge between components of the vessel and which has a long life.

To accomplish the aforementioned and other objectives, one embodiment of a carrier vessel in accordance with the present invention employs first and second shell members, each having an opposing engagement surface, and a sealing member disposed adjacent to one of the engagement surfaces. When the first and second shell members are joined together to form a carrier vessel, the sealing member provides a substantially fluid-tight seal between the first and second shell members.

More particularly, a preferred embodiment of the present invention includes the first shell member having a substantially semi-cylindrical body portion and a first engagement surface extending substantially about the perimeter of the body portion. The second shell member has a substantially semi-cylindrical body portion and a second engagement surface extending substantially about the perimeter of the body portion and interconnectable with the first engagement surface. One engagement surface preferably includes a groove extending substantially about the perimeter of the body portion for receiving a compressible sealing member and the other engagement surface preferably includes a tongue member extending substantially about the perimeter of the body portion and interconnectable with the groove in the opposing engagement surface. In one embodiment, a smaller in size nub extends from the tongue member for extension in one direction into the groove. In a related embodiment, a boss is provided and extends into the groove from an opposite direction. When the first and second shell members are engaged, such as by latching, to form a carrier vessel, the tongue member or the nub thereof compressively engages the sealing member disposed in the groove, together with the boss extending into the groove when present, to establish a substantially leak-proof seal between the first and second shell members. The carrier vessel of the present invention thus provides substantially leak-proof containment of fluids which may spill from their primary containers into the carrier vessel. Additionally, when the nub and/or boss are utilized, because of the relatively smaller area of contact between them and the sealing member, less force is required to open the carrier vessel, yet the carrier vessel is able to handle or withstand the same psi without resulting in leakage of any fluids that might be contained therein.

The carrier vessel also includes latch assemblies for releasably connecting the shell members together. Each latch assembly includes a latch member that is pivotally movable in closing and opening the carrier vessel. Each latch assembly preferably includes a spring member operatively associated with the latch member for holding the latch member in an open position to signal the user of the carrier vessel that the carrier vessel is not in the closed position.

The carrier vessel also has wear bands for engaging the walls of the pneumatic tube system and for facilitating movement of the carrier vessel therein. Each wear band includes a hinge band and an outer material, such as a carpet-like composite material, that engages the pneumatic tube walls during movement of the carrier vessel in the pneumatic tube system. The hinge band has a living hinge member that permits relative movement of the shell members in opening and closing the carrier vessel.

Additional features of the carrier vessel include lips adjacent to ends of recessed channels in which the wear bands are disposed. The lips define areas for receiving ends of the wear band to constrain unwanted outward movement of the composite outer material from the hinge band. A recessed area is formed adjacent to each latch member to facilitate engagement and opening of the latch member by means of the thumb or finger of the user. A cavity is formed at each of the two ends of each of the two shell members, with ribs provided in these cavities, so that the user can readily grip and hold the carrier vessel. A hinge interconnector assembly and a locator member, which are provided at the opposite side of the shell members from the latch assemblies, facilitate and enhance proper hinged interconnection between the two shell members.

Additional advantages of the present invention will become readily apparent from the following discussion, particularly when taken together with the accompanying drawings.

BRIEF DESCRIPTION OF THE DRAWINGS

FIG. 3 is a first side elevational view of the carrier vessel illustrated in FIG. 1, but with portions of the wear band removed;

FIG. 4 is a lateral, cross-sectional view of the wear band in a recessed channel;

FIG. 6 is a lateral cross-sectional view, taken alone lines 6—6 of FIG. 3, illustrating the engagement between shell members at a wear band;

FIG. 7 is an enlarged, fragmentary section of FIG. 6 illustrating the relationship among the thicknesses of the shell member, hinge band and composite outer material, together with the depth of the recessed channel;

FIG. 8 is a lateral cross-sectional view, taken along lines 8—8 of FIG. 3, illustrating the hinge interconnector assembly;

FIG. 14 is an enlarged, sectional view of an embodiment of the latch assembly that includes a locking pin.

DETAILED DESCRIPTION

Figure 1:
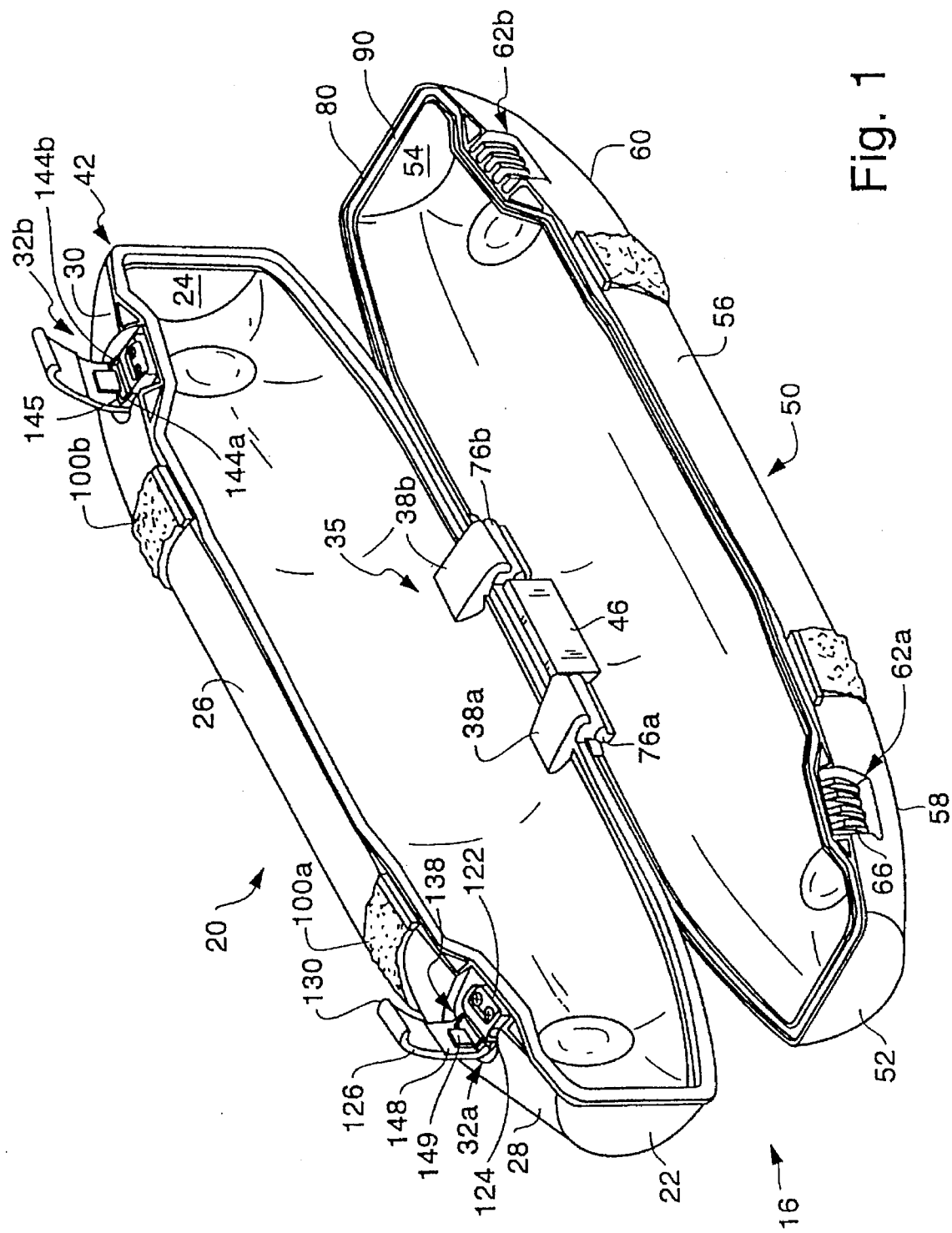
FIG. 1 is a perspective view of one embodiment of a carrier vessel in accordance with principles of the present invention.

FIG. 1 illustrates one embodiment of a carrier vessel 16 in accordance with the present invention. The carrier vessel 16 includes a first shell member 20 and a second shell member 50 engageable along opposing engagement surfaces 42, 80, respectively, to form a substantially cylindrical carrier vessel 16 which may be used to house objects being transported in a pneumatic tube transport system. Advantageously, when the first shell 20 and second shell 50 are secured, a substantially fluid-tight seal is formed between the two shell members to inhibit the passage of fluids into or out of the carrier vessel 16. Accordingly, the vessel 16 may be used to transport fluids in a pneumatic tube transport system.

The first shell member 20 includes a flat semi-circular first end wall 22 and a flat semi-circular second end wall 24 opposite the first end wall 22. A semi-cylindrical housing wall 26 extending between the first end wall 22 and the second end wall 24 has a tapered or frusto-conical first end 28 and a substantially similarly tapered or frusto-conical second end 30. The edges of the first end wall 22, second end wall 24 and housing wall 26 define a first engagement surface 42 which extends substantially entirely in a single plane about the perimeter of the first shell member 20. Second shell member 50 is similar in shape to the first shell member 20 and includes a flat semi-circular first end wall 52, a flat semi-circular second end wall 54, and a semi-cylindrical housing wall 56 extending between the first end wall 52 and the second end wall 54. Housing wall 56 also has a tapered first end 58 and a tapered second end 60. The edges of the first end wall 52, second end wall 54 and housing wall 56 define a second engagement surface 80 which extends substantially entirely in a single plane about the perimeter of the second shell member 50. Shell members 20, 50 are preferably formed from a suitably clear, rigid plastic material, however it will be appreciated that numerous other materials, including metals or carbon composite materials, could be used.

First and second exterior latch assemblies 32a, 32b are secured to housing wall 26. Latch assemblies 32a, 32b will be described in greater detail later. An interconnector assembly 35 joins the first and second shell members 20, 50 together to permit pivotal movement therebetween. The interconnector assembly 35 includes first and second hook members 38a, 38b that are joined to the interior surface of housing wall 26. As illustrated in FIG. 8, with respect to first hook and mating members 38a, 76a, each hook member 38a, 38b extends beyond the plane of the first engagement surface 42 to engage first and second mating members 76a, 76b, respectively, in order to interconnect the shell members 20, 50 together at one of their longitudinal sides. The first and second mating members 76a, 76b extend longitudinally along housing wall 56 for engaging the first and second hook members 38a, 38b respectively. Although the disclosed embodiment employs two hook members 38a, 38b and two mating members 76a, 76b, which are an integral part of the shell members 20, 50, respectively, it will be appreciated that more or fewer hook and mating members 38a, 38b, 76a, 76b could be used or that such hook and mating members 38a, 38b, 76a, 76b could be formed separately and secured to shell members 20, 50 using conventional fasteners. As seen in FIG. 1, a locator member 46 is disposed between the two hook members 38a, 38b and is used to ensure that the shell members 20, 50 are properly aligned for a complete and secure connection when the carrier vessel is in the closed position. That is, the locator member 46 does not allow the two shell members 20, 50 to be latched together in a closed position other than a position in which the desired sealing engagement between the two shell members 20, 50 is achieved.

Figure 2A:
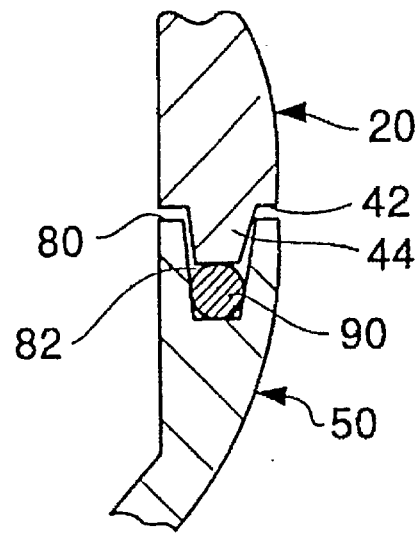
FIGS. 2A–2B are enlarged, segmented lateral cross-sectional views of one embodiment of a carrier vessel illustrating the connection between first and second engagement surfaces in uncompressed and compressed sealing member configurations, respectively.
Figure 2B:
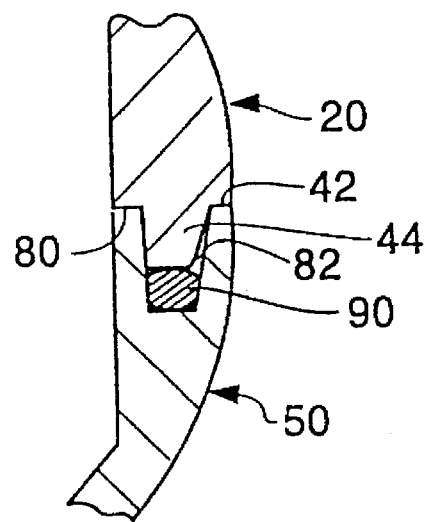

One feature of the present invention relates to the substantially fluid tight seal formed between first engagement surface 42 and second engagement surface 80 when the vessel 10 is closed. Referring to FIGS. 1 and 2A–2B, first engagement surface 42 includes a tongue member 44 extending therefrom. Second engagement surface 80 includes a groove 82 shaped to mate with tongue member 44 and having sufficient depth to house a compressible sealing member 90. Sealing member 90 may be formed from any number of conventional sealing materials, including rubber or synthetic polymers and a closed or open cell foam that is made into a sealing ring. As illustrated in FIG. 2A, when first shell member 20 and second shell member 50 are connected, tongue member 44 extends into groove 82 to contact a portion of sealing member 90. Referring to FIG. 2B, when first shell member 20 and second shell member 50 are securely latched, tongue member 44 compressively engages portions of sealing member 90 to form a substantially leak-proof seal about substantially the entire perimeter of vessel 16. This feature provides a vessel 16 suitable for transporting fluids in a pneumatic tube transport system. To assist in the desired sealing connection between the two shell members 20, 50, at center portions of the tongue member 44, midway between ends thereof, the tongue member 44 is extended or is longer to provide the desired seal when such center portions extend into the groove 82 and contact the sealing member 90 to compress it.

Figure 2C:
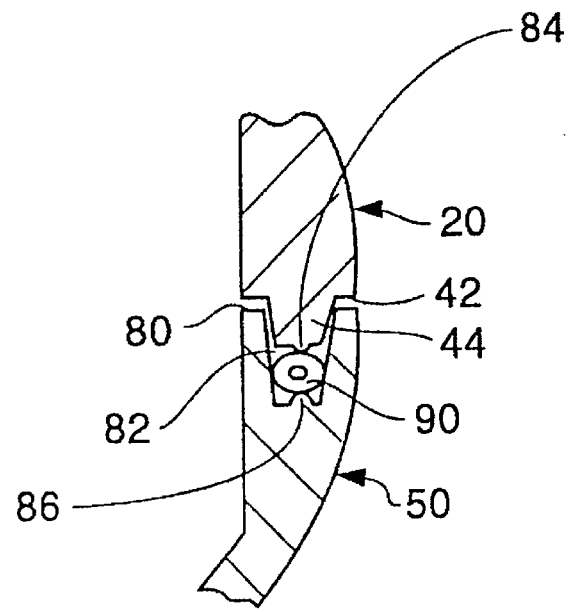
FIGS. 2C–2D are enlarged, segmented lateral cross-sectional views of another embodiment of a carrier vessel illustrating a tongue member having a nub and a boss extending into the groove containing the sealing member.
Figure 2D:
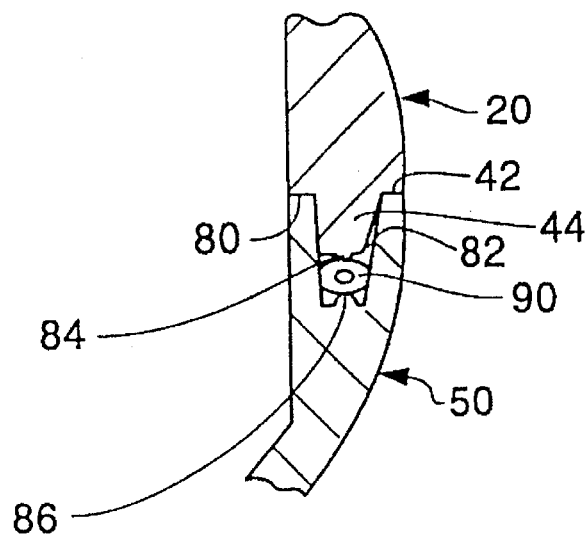
Figure 2E:
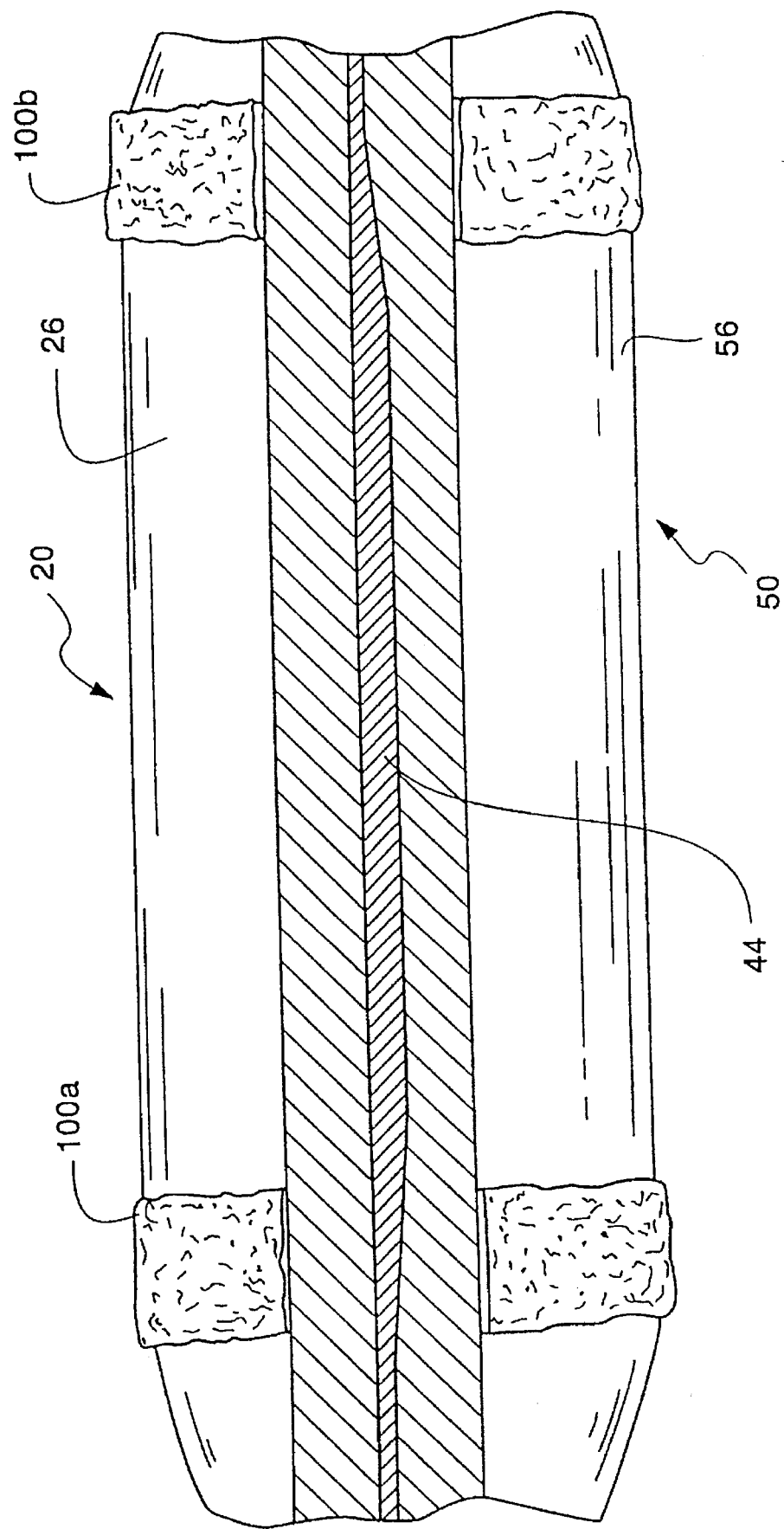
FIG. 2E is an enlarged, segmented longitudinal cross-sectional view of still another embodiment of a carrier vessel illustrating a tongue member of a varying height or extension along its length.

Another embodiment involving the first engagement surface 42 and the second engagement surface 80 to establish a fluid tight seal is illustrated in FIGS. 2C–2D. In particular, the first shell member 20 has a nub 84 that extends into the groove 82. The nub 84 is integral with but discontinues the shape or pattern of the tongue member 44. The nub 84 extends from the free end of the tongue member 44. The nub 84 has a different size from that of the tongue member 44 including having a smaller width and a smaller height or extension in a direction towards the groove 82. The nub 84 changes the shape or pattern of the tongue member by a greater in distance change in the lateral direction than the vertical direction in initiating the shape of the nub 84. A boss 86 is also shown, which extends into the groove 82 in a direction opposite that of the extension of the nub 84. In one embodiment, the nub 84 is associated with a smaller radius than the boss 86, e.g., the nub 84 has a radius of 0.020 inch and the radius of the boss 86 is greater than that radius. Also illustrated in FIG. 2C is a different sealing member 90. That is, a hollow O-ring is employed. When the engagement surfaces 42, 80 are in contact, as seen in FIG. 2D, the hollow sealing member or O-ring 90 is compressed using the nub 84 and the boss 86, which causes a flattening of the sealing member 90 and a reduction in the size of the hollow portion thereof. The hollow O-ring 90 acts to eliminate or substantially reduce a problem that can occur over repeated openings/closings of the carrier vessel 16. Specifically, as a result of such repeated openings/closings, a non-hollow sealing member may not compress as fully as before, thereby jeopardizing or reducing the leakage protection function associated with the sealing member 90. In one embodiment, the outer diameter of the hollow O-ring is in the range of ⅛–3/16 inch and has a thickness in the range of 0.020–0.050 inch. Such a sealing member 90 also has a durometer reading in the range of 10–50 Shore A. The combination of the nub 84, boss 86 and hollow sealing member 90 serves two main functions. Sufficient compressive forces on the sealing member 90 result in a fluid tight seal, which is at least the same or comparable to the embodiment of FIGS. 2A–2B. Furthermore, due to the relatively smaller contact or compressing engagement between the nub 84 and the sealing member 90, in contrast to the contact between the free end of the tongue member 42 and the sealing member 90 in the embodiment of FIGS. 2A–2B, less force is required to disengage the two shell members 20, 50 or open the carrier vessel 16. This facilitates the opening and closing of the carrier vessel 16. Another embodiment intended to facilitate the opening/closing of the carrier vessel 16, while providing a comparable sealing function, is illustrated in FIG. 2E. In this embodiment, the tongue member 44 does not have the same height or extension at its free end along its length. In the illustrative embodiment of FIG. 2E, a substantially continuous variation in the height or extension of the tongue member 44 is illustrated. As with other embodiments, this variation in the tongue member 44 provides the necessary sealing function and is also useful in facilitating the openings/closings of the carrier vessel 16. As can be appreciated, other embodiments that relate to a varying height or extension of the tongue member 44 could be devised, such as having discrete or discontinuous extensions of the tongue member 44 along its length. Importantly, the relatively longer heights or extensions should be located along the length of the tongue member 44 where such portions are at a greater distance from the latching members or other means that are utilized in joining the two shell members 20, 50 together.

Figure 5:
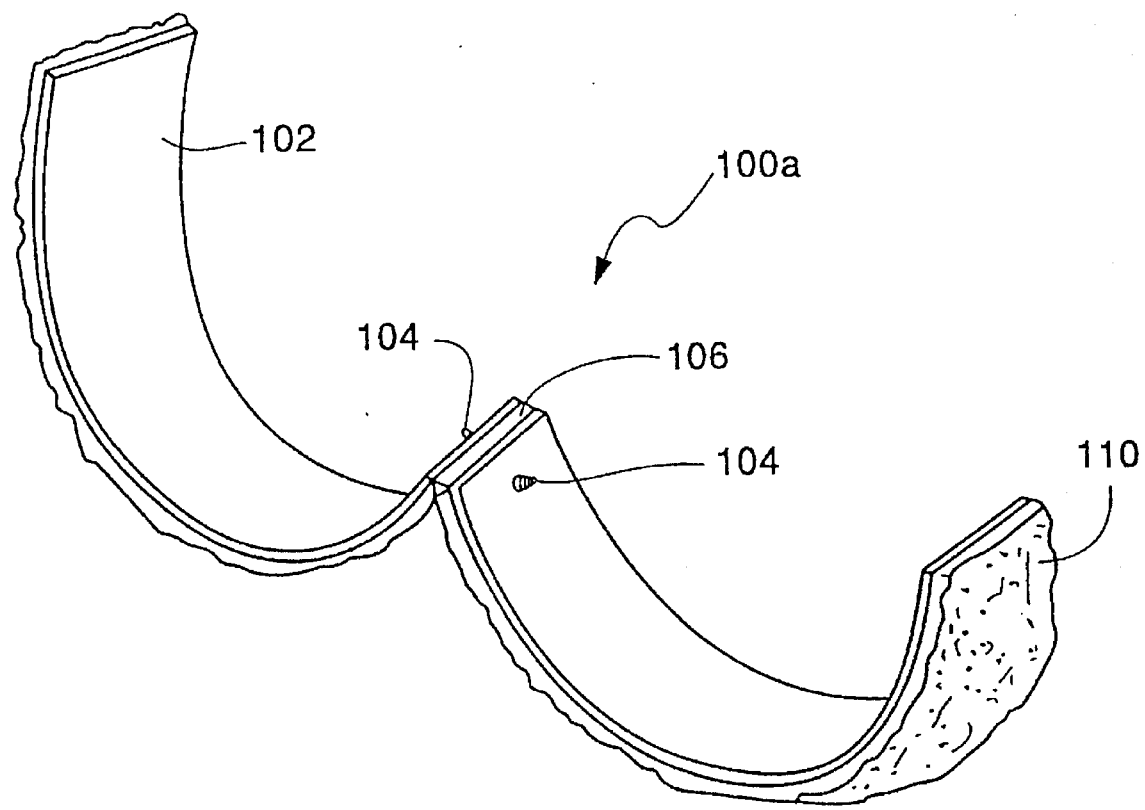
FIG. 5 is a perspective view of the wear band.

The carrier vessel 16 also includes wear bands 100 for contacting the pneumatic tube system during movement of the carrier vessel 16 in order to facilitate movement while avoiding unwanted noise. As illustrated in FIGS. 1 and 3, identical first and second wear bands 100a, 100b are joined to the first shell member 20 and the second shell member 50. As seen in FIGS. 3–5, each wear band 100a, 100b includes a hinge band 102, and an outer material 110 that extends outwardly from the hinge band 102. In the embodiment of FIG. 5, the outer material 110 is preferably made of a carpet, felt or other materials to restrict the flow of air passing by the carrier vessel 16 in the pneumatic tube system and also serves as a cushion between the rigid body of the carrier vessel 16 and the walls of the pneumatic tube system. In one embodiment, the outer material 110 is joined to the hinge band 102 by conventional attachment, such as adhesives and/or mechanical hardware. In another embodiment, the outer material and the hinge band are made together to provide a one-piece manufactured unit. As depicted in FIG. 5, the hinge band 102 includes an integral hinge section 106 exposed about at the mid-portion of the hinge band 102. The integral hinge section 106 is an integral part of the hinge band 102 and acts as a hinge in permitting pivotal movement of sections of the hinge band at the integral hinge section 106. The wear bands 100a, 100b also include fasteners, such as screws 104, for connecting the wear bands 100a, 100b to the shell members 20, 50.

With respect to the attachment of the wear bands 100a, 100b, reference is made particularly to FIGS. 3 and 4. As seen in FIG. 3, the shell members 20, 50 have recessed channels 94 formed therein about their peripheries or circumferences. With part of the wear bands 100a, 100b removed, it seen that holes 96 are also formed in the recessed channels 94 to receive the fasteners 104, with the holes 96 extending only partially into the walls of the shells 20, 50. As can be appreciated, further holes and fasteners could be provided to locate and retain the wear bands 100a, 100b to the shell members 20, 50 in their recessed channels 94. In addition to the fasteners 104, the wear bands 100a, 100b are fixedly attached in the recessed channels 94 by means of other conventional attachment techniques, such as an adhesive being provided between the inner surface of the hinge band 102 and the outer surface of the recessed channel 94. With reference also to FIG. 6, the outer surface of the hinge band 102 at the integral hinge section 106 is devoid of an outer composite material, such as carpet or felt. In another embodiment, the composite outer material 110 extends across the integral hinge section 106. As illustrated in FIGS. 4 and 7, the depth of the recessed channel 94 is greater than the thickness or height of the hinge band 102. Part of the thickness of the composite outer material 110 is also within the recessed channel 94 while outward extending portions of the composite outer material extend beyond the recessed channel 94.

In addition to fasteners and adhesive for holding the wear bands 100a, 100b in place in the recessed channels 94, as seen in FIG. 6, lips 114a, 114b are formed as part of the shell members 20, 50 respectively, at the ends of the recessed channels 94 laterally adjacent to latching mechanisms that releasably hold the shell members 20, 50 together. The lips 114a, 114b define areas for receiving ends of the hinge band 102 and contribute to holding those portions of the wear bands 100a, 100b in place.

Figure 12:
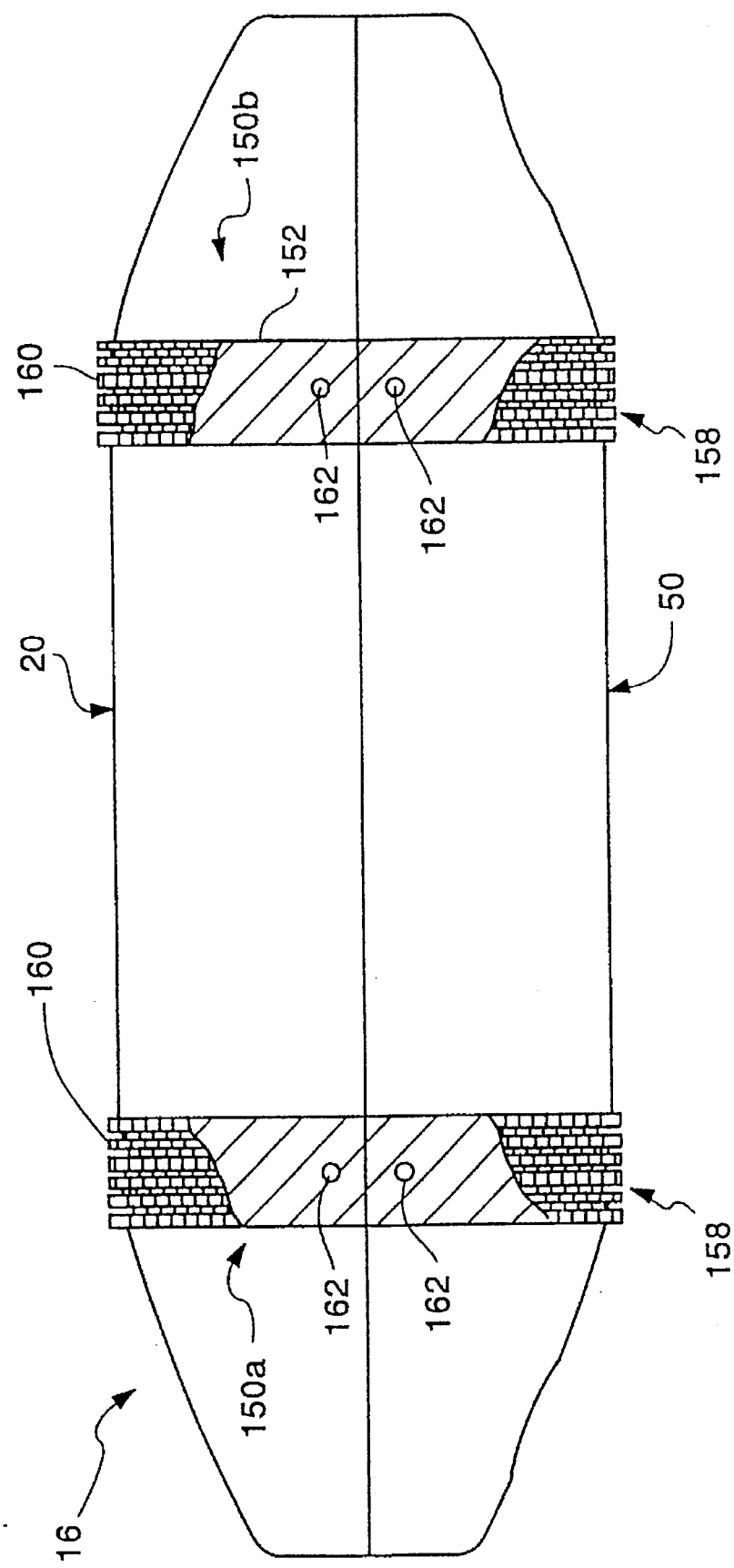
FIG. 12 is a side elevational view similar to FIG. 3, but illustrating another embodiment of a wear band.
Figure 13:
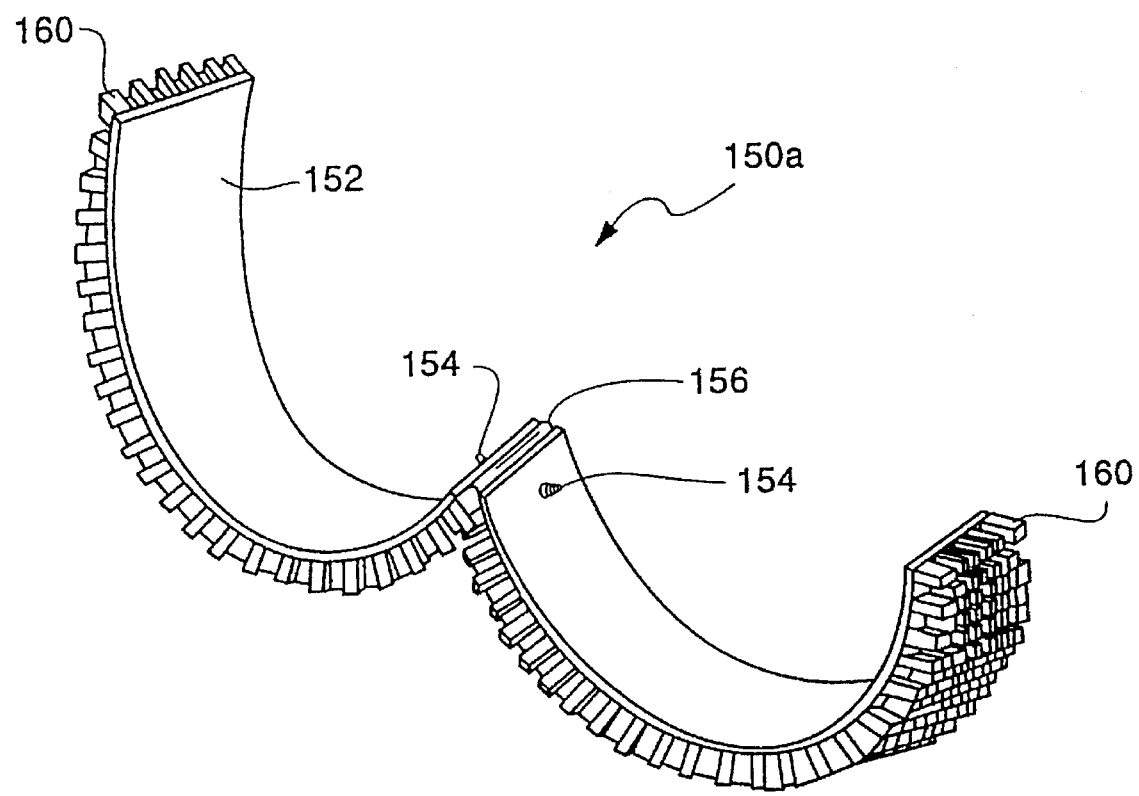
FIG. 13 is a perspective view of the wear band of FIG. 12.

Referring now to FIGS. 12 and 13, another embodiment of a wear band is disclosed. In this embodiment, the wear bands 150a, 150b are preferably integral or one-piece units. Specifically, each wear band 150a, 150b has a hinge band 152 as an inner layer and a plurality of discrete sail members 160 that constitute an outer material, with the sail members 160 being formed integrally with the hinge band 152. Like the previous embodiment, an integral hinge section 156 is defined at about the mid-portion of the longitudinal extent of the hinge band 152 to act as a hinge and permit pivotal movement of the wear band sections at the integral hinge section 156. The sail members 160 provide enhanced durability and decreased wear characteristics. Adjacent to the living hinge member 156, holes are formed through the wear bands 150a, 150b and are able to receive fasteners 154, such as screws, that are used in attaching the wear bands 150a, 150b to the shell members 20, 50. Like the previous embodiment, the wear bands 150a, 150b can be attached to the shell members 50 using conventional means, such as adhesives. The conventional means for attachment enables the wear bands of both embodiments to be removed and replaced after sufficient wear has occurred.

The latching or connecting mechanisms for releasably holding the shell members 20, 50, together are next described in more detail, particularly with reference to FIGS. 1, 9 and 10A–10C. As seen in FIG. 1, these latching or connecting mechanisms comprise a pair of latch assemblies 32a, 32b attached to the first shell member 20 and a pair of interacting clasp assemblies 62a, 62b that cooperate with the latch assemblies 32a, 32b, respectively, and which are formed with the second shell member 50. Each of the latch assemblies 32a, 32b includes a latch member 126 having a curved tip 130. The latch assemblies 32a, 32b also have a pivotal intermediate member 124 having a first hinge 128 that permits pivotal movement between the latch member 126 and the intermediate member 124. A second hinge 125 enables pivotal movement between the intermediate member 124 and a base member 122. The base member 122 is joined to the first shell member 20 by means of conventional fasteners 127 that are insertable through a bore hole formed in the base member and which extends into the first shell member 20. The base member 122 also preferably has two alignment pins (not shown) that are located adjacent to and outwardly from the fasteners 127 to permit proper alignment between the base member 122 and the first shell member 20.

Figure 9:
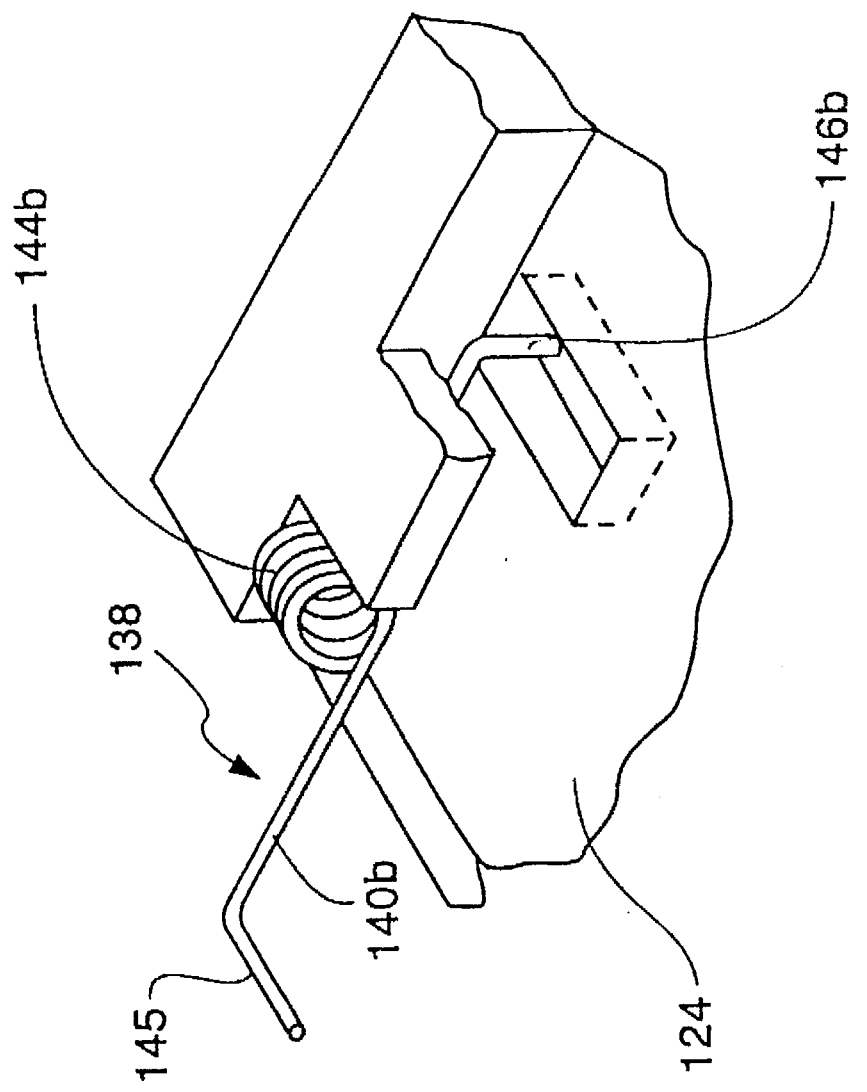
FIG. 9 is an enlarged fragmentary section illustrating the spring member held to the intermediate member of the latch assembly.

The latch assemblies 32a, 32b also include a spring member 138 that includes first and second legs 140a, 140b, with each having a coiled spring portion 144a, 144b, respectively. A cross member 145 joins the legs 140a, 140b together. As seen in FIG. 9, the second leg 140b, terminates in a bent free end 146b, just as does the first leg 140a (which is not shown). Each of the two legs 140a, 140b is fixedly held to the intermediate member 124 using slots formed therein.

Figure 10A:
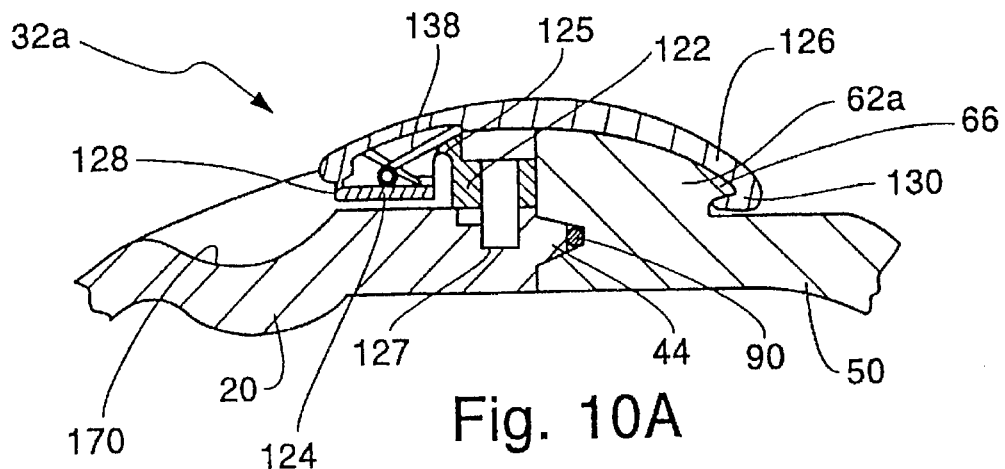
FIGS. 10A–10C are enlarged, fragmentary sectional views of a latch assembly illustrating the latching between shell members of the carrier vessel.
Figure 10B:
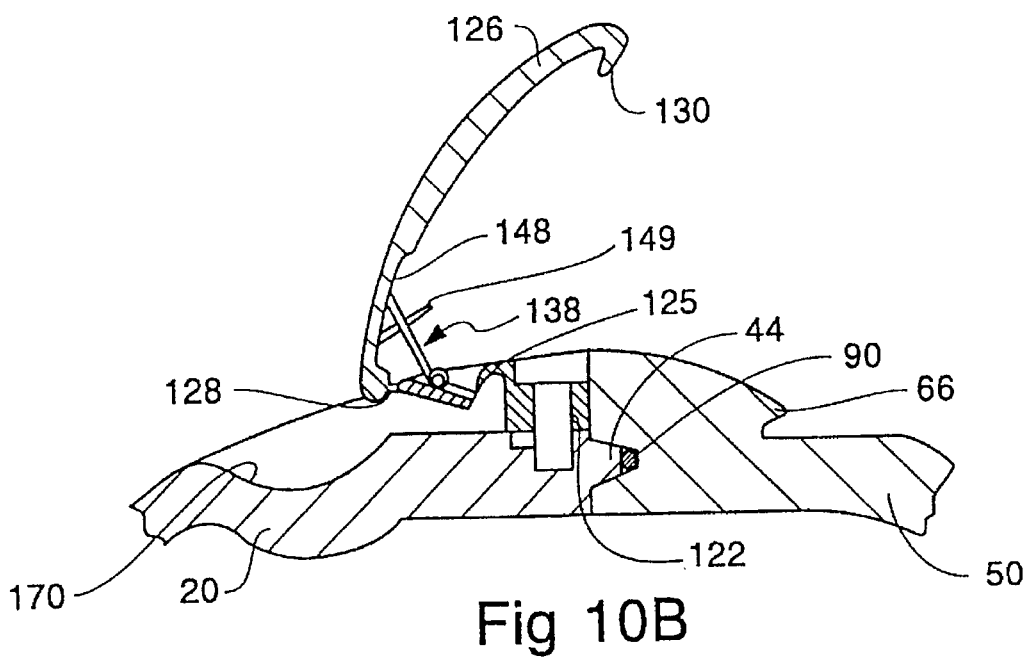
Figure 10C:
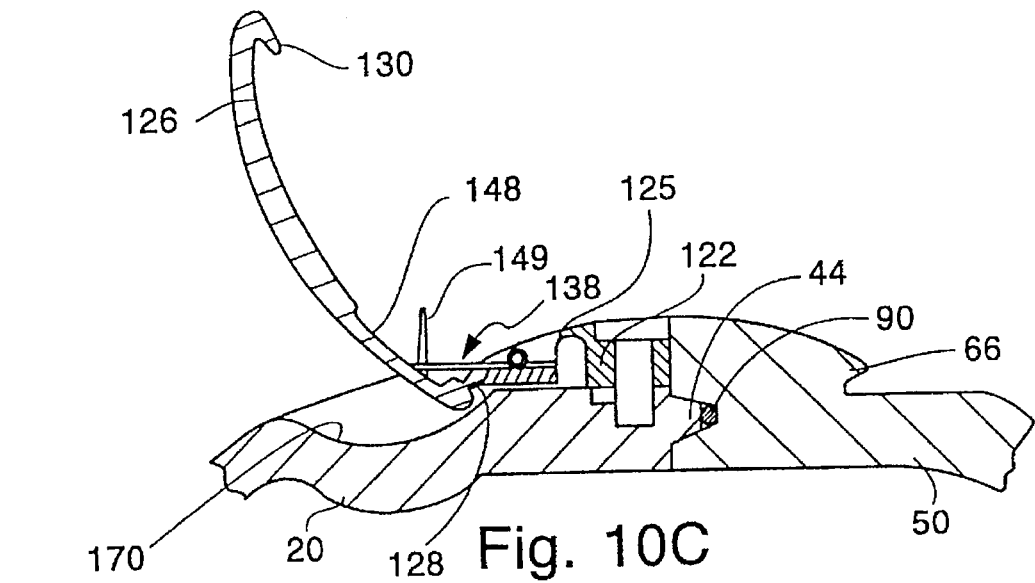

As illustrated in FIGS. 10B, 10C, the cross member 145 of the spring member 138 moves along a slide section 148 defined by an inner portion of the latch member 126 during opening and closing of the latch member 126. Specifically, in describing the operation of the latch assembly 32a, as seen in FIG. 10A, the curved tip 130 of the latch member 126 interconnects with the clasp assembly 62a having one or more ribs 66. In order to release the latch assembly 32a from the clasp assembly 62a, the latch member 126 is caused to move forwardly of the ribs 66 by pivoting about hinge 125. Once released from engaging the ribs 66, the latch member 126 is caused to move in a direction away from clasp assembly 62a about hinge 128 under the force of the spring member 138. As seen in FIG. 10B, as the latch member 126 pivots away from the clasp assembly 62a, the cross member 145 of the spring member 138 moves downwardly along the slide section 148. With reference to FIG. 10C, the force of the spring member 138 continues to cause the latch member 126 to pivot until the cross member 145 of the spring 138 engages and is stopped by a wall section 149 joined to the slide section 148 near its bottom end. In this position, the spring member 138 holds the latch member 126 in its open position. Due to the action of the spring member 138 in holding the latch member 126 in its open position, the user of the carrier vessel 116 can readily see that the carrier vessel 16 is not completely closed and should not be placed in the pneumatic tube system.

In changing from the open position to the closed position, the opposite sequence of steps occurs including pivoting of the latch member 126 and the intermediate member 124 at hinges 128, 125, respectively, while the force applied to the latch member 126 acts against the force of the spring member 138 to cause the cross member 145 to move away from the wall section 149 and move along the slide section 148. Such movements continue until the closed position of the latch assembly 32a is achieved, as illustrated in FIG. 10A.

With respect to enhancing the connection or latching of the latch assemblies 32a, 32b, in one embodiment, additional means are provided. With reference to FIG. 14, latch assembly 180 is disclosed that includes a latch member 182 having angled slots 184 formed in side walls of the latch member 182, with one of the side walls 186 being illustrated. In this embodiment, a locking pin 188 is disposed in the same plane as the fasteners 190 and is fixedly held therebetween. When the latch member 182 is in the closed position, the locking pin 188 is positioned in the angled slots 184 to assure a latched or closed position of the latch assembly 180. As can be understood, the latch member 182 is caused to move so that the angled slots 184 move relative to the locking pin 188 past the open end of the slots 184 in order to unlock the latch member 182 from the locking pin 188.

With regard to facilitating the change from the closed position to the open position for the latch assembly 32a, a recessed area 170 is formed adjacent to the end of the latch member 126 at the first hinge 128. The recessed area 170 enables the user to readily manipulate that end of the latch member to cause it to move forwardly of the clasp assembly 62a.

Figure 11:
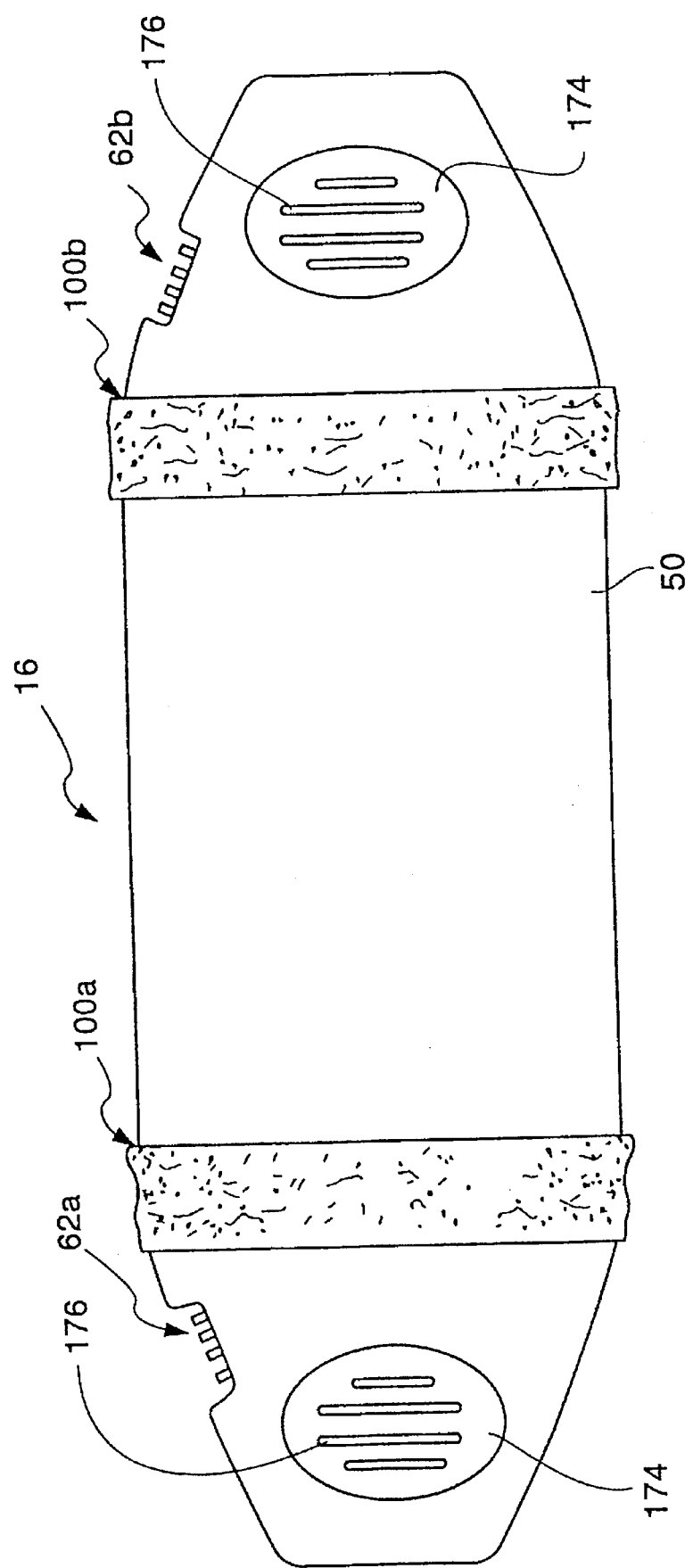
FIG. 11 is a second side elevational view of the carrier vessel in an unlatched position illustrating cavities formed in the shell member for gripping and holding the carrier vessel.

In addition to such recessed areas 170, as seen in FIG. 11, the carrier vessel also has body cavities 174 of a depth for receiving fingers and/or thumbs of the user of the carrier vessel 16. The body cavities 174 define areas below the surfaces of the first and second shell members 20, 50 and are of a depth to receive, in comfortable fashion, the user's thumbs and/or fingers for holding the carrier vessel 16 at its ends. Preferably, a number of raised ridges 176 are formed in the body cavities 174 and extend outwardly from the bottoms thereof to assist in providing a desired gripping of the carrier vessel, while avoiding slipping since the bottom surface is not smooth due to the raised ridges 176.

In operation, articles to be transported are placed inside carrier vessel 16, which is then closed by first engaging hook members 38a, 38b with opposing mating members 76a, 76b, respectively, and then securing latch assemblies 32a, 32b with opposing clasp assemblies 62a, 62b, respectively. When latch assemblies 32a, 32b are secured, sealing member 90 is compressed between engagement surfaces 42 and 80 to form a substantially fluid-tight seal between engagement surfaces 42 and 80. The vessel 16 may then be placed in a pneumatic tube transport system in accordance with conventional practice.

The foregoing description of the present invention has been presented for purposes of illustration and description. Furthermore, the description is not intended to limit the invention to the form disclosed herein. Consequently, variations and modifications commensurate with the above teachings, and within the skill and knowledge of the relevant art, are part of the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A carrier vessel for use in a pneumatic tube transport system, comprising:
    a first shell member having a body and a first engagement surface disposed about the perimeter of said body;
    a second shell member having a body and a second engagement surface interconnectable with portions of said first engagement surface;
    a wear band connected to said first and second shell members, said wear band having a thickness and outer material for contacting the pneumatic tube transport system when the carrier vessel is caused to be transported thereby; and
    a sealing member disposed adjacent said first engagement surface whereby, when said first shell member is interconnected with said second shell member so that said first and second shell members are in a closed position, said sealing member controls passage of fluids into and out of said vessel;
    wherein said wear band is a single one-piece member that includes an integrally formed hinge band that permits said first and second shell members to change from said closed position to an open position while said wear band remains as said single member when said first and second shell members are in said open position.

2. A carrier vessel according to claim 1, wherein:
    said wear band includes a lower section and said hinge band and said lower section of said wear band are made of the same material.

3. An carrier vessel according to claim 2, wherein:
    said second engagement surface includes a tongue member interconnectable with said groove and wherein, when said first shell member is interconnected with said second shell member, said sealing member is compressively engaged between portions of said tongue member and said groove.

4. A carrier vessel according to claim 3, wherein:
    said sealing member includes a hollow portion and a nub extends from said tongue member, with a boss extending into said groove in a direction opposite from a direction in which said nub extends into said groove, said nub being a discontinuous extension of said tongue member.

5. A carrier vessel according to claim 1, wherein:
    said outer material is made from a different composition than said hinge band.

6. A carrier vessel according to claim 1, wherein:
    said hinge band includes a hinge section without said outer material being joined thereto.

7. A carrier vessel according to claim 1, wherein:
    said first and second shell members include first and second recessed channels, respectively, and with the height of each of said first and second recessed channels being greater than said thickness of said hinge band.

8. A carrier vessel according to claim 7, wherein:
    a combined thickness of said hinge band and said outer material is greater than said height of each of said recessed channels.

9. A carrier vessel according to claim 7, further comprising:
    a lip defining a receiving area adjacent to an end of at least one of said first and second recessed channels with an end of said wear band disposed in said receiving area.

10. A carrier vessel according to claim 1, wherein:
    said wear band includes a plurality of discrete sail members.

11. A carrier vessel according to claim 10, wherein:
    said sail members are integrally formed with said hinge band.

12. A carrier vessel according to claim 1, wherein:
    said first and second shell members are interconnected using at least a first hook member and a first mating member and in which said first hook member is joined to an inner surface of one of said first and second shell members and said first mating member is joined to an inner surface of one of the other of said first and second shell members so that each thereof is located in said vessel when said vessel is closed.

13. A carrier vessel according to claim 1, wherein:
    said first and second shell members are interconnected using a latch assembly and said latch assembly includes a latch member and a spring member operatively engaging said latch member for holding said latch member in said open position.

14. A carrier vessel according to claim 13, wherein:
    said latch assembly includes a member having first and second slots and said spring member includes first and second legs joined together by a cross member and in which said first and second legs are held in said first and second slots, respectively.

15. A carrier vessel according to claim 13, wherein:
    said latch assembly includes a latch member and a recessed area adjacent to said latch member for facilitating movement of said latch member to said open position.

16. A carrier vessel according to claim 1, further including:

a latch assembly that includes a latch member, a clasp member and a spring member and wherein said latch member has a free end and a pivot end with said free end being detachably held by said clasp member and said clasp member being able to pivot about said pivot end, a recessed area formed in material adjacent to said pivot end to facilitate movement of said pivot end, wherein detachment of said latch member from said clasp member is initiated by movement of said pivot end before movement of said free end and in which said spring member has a force that holds said latch member in said open position and said force of said spring member is overcome to place said latch member in said closed position.

17. A carrier vessel according to claim 1, further comprising:

at least one locator member positioned along at least one of said first and second shell members for ensuring proper interconnection between said first and second shell members.

18. A carrier vessel according to claim 1, further comprising:

at least a first holding cavity for grasping the carrier vessel, said holding cavity being located adjacent an end of the carrier vessel and having a bottom that is recessed relative to adjacent portions of said end of the carrier vessel.

19. A carrier vessel according to claim 1, wherein:

at least one of said first and second shell members has a tongue member that is longer along portions thereof.

20. A carrier vessel for use in a pneumatic tube transport system, comprising:

a first shell member having a body and a first engagement surface disposed above the perimeter of said body;

a second shell member having a body and a second engagement surface interconnectable with portions of said first engagement surface;

a sealing member disposed adjacent said first engagement surface whereby, when said first shell member is interconnected with said second shell member, said sealing member controls passage of fluids into and out of said vessel;

a latch assembly for interconnecting said first and second shell members, said latch assembly including a latch member, clasp member and a spring member operatively engaging said latch member for holding said latch member in an open position so that, when said latch assembly is not interconnecting said first and second shell members, said open position provides a visual indication that said vessel is not in a closed position, said latch member having a free end and a pivot end with said free end being detachably held by said clasp member and said clasp member being able to pivot about said pivot end, a recessed area formed in material adjacent to said pivot end to facilitate movement of said pivot end, wherein detachment of said latch member from said clasp member is initiated by movement of said pivot end before movement of said free end and in which said spring member has a force that holds said latch member in said open position and said force of said spring member is overcome to place said latch member in said closed position; and a hinge interconnector assembly for interconnecting said first and second shell members together.

21. A carrier vessel according to claim 20, wherein:

said hinge interconnector assembly includes at least a first hook member and a first mating member, with said first hook member being joined to an inner surface of said first shell member and said first mating member being joined to an inner surface of said second shell member and in which each of said first hook member and said first mating member is disposed within said vessel when said vessel is closed.

22. A carrier vessel according to claim 20, wherein:

said latch member has a length and a tip and in which said latch member is moved in a direction substantially along its length to release said tip from engagement with said clasp member.

23. A carrier vessel for use in a pneumatic tube transport system, comprising:

a first shell member having a body and a first engagement surface disposed above the perimeter of said body;

a second shell member having a body and a second engagement surface interconnectable with portions of said first engagement surface;

a sealing member disposed adjacent said first engagement surface whereby, when said first shell member is interconnected with said second shell member, said sealing member controls passage of fluids into and out of said vessel;

a latch assembly for interconnecting said first and second shell members; and a hinge interconnector assembly including at least a first hook member and a first mating member, with said first hook member being joined to an inner surface of said first shell member and said first mating member being joined to an inner surface of said second shell member and in which each of said first hook member and said first mating member is disposed within said vessel when said vessel is closed.

24. A carrier vessel according to claim 23, wherein:

said latch assembly includes a latch member and a spring member operatively engaging said latch member for holding said latch member in an open position.

25. A carrier vessel according to claim 23, wherein:

said latch assembly includes first and second hinges to enable pivotal movement at said first and second hinges including pivotal movement of said latch member.

* * * * *

UNITED STATES PATENT AND TRADEMARK OFFICE
CERTIFICATE OF CORRECTION

PATENT NO. : 5,655,677
DATED : August 12, 1997
INVENTOR(S) : Fratello et al.

It is certified that error appears in the above-identified patent and that said Letters Patent is hereby corrected as shown below:

On title page, after item [22] insert the following:

[63] Related U.S. Application Data
Continuation-in-part of Ser. No. 08/398,287, March 3, 1995, abandoned Signed and Sealed this Nineteenth Day of May, 1998

Attest:

BRUCE LEHMAN

Attesting Officer

Commissioner of Patents and Trademarks